(12) United States Patent
Hodgson et al.

(10) Patent No.: US 10,267,194 B2
(45) Date of Patent: Apr. 23, 2019

(54) DEVICE FOR PROVIDING A LIQUID ADDITIVE

(71) Applicant: CONTINENTAL AUTOMOTIVE GMBH, Hannover (DE)

(72) Inventors: Jan Hodgson, Troisdorf (DE); Sven Schepers, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 274 days.

(21) Appl. No.: 14/441,895

(22) PCT Filed: Oct. 25, 2013

(86) PCT No.: PCT/EP2013/072454
§ 371 (c)(1),
(2) Date: May 11, 2015

(87) PCT Pub. No.: WO2014/072192
PCT Pub. Date: May 15, 2014

(65) Prior Publication Data
US 2015/0285120 A1 Oct. 8, 2015

(30) Foreign Application Priority Data
Nov. 9, 2012 (DE) .......... 10 2012 110 760

(51) Int. Cl.
*F01N 3/20* (2006.01)
*B65D 25/02* (2006.01)
*B60K 13/04* (2006.01)

(52) U.S. Cl.
CPC ........... *F01N 3/2066* (2013.01); *B60K 13/04* (2013.01); *B65D 25/02* (2013.01); *F01N 2610/02* (2013.01); *F01N 2610/1406* (2013.01); *F01N 2610/1413* (2013.01); *Y02A 50/2325* (2018.01); *Y02T 10/24* (2013.01); *Y10T 29/49826* (2015.01)

(58) Field of Classification Search
CPC ................................................ F01N 2610/1433
See application file for complete search history.

(56) References Cited

U.S. PATENT DOCUMENTS 4,876,124 A * 10/1989 Dallum ............... B65D 90/022
220/560.12
5,269,436 A * 12/1993 Bachmann .......... B29C 63/0021
220/565

(Continued)

FOREIGN PATENT DOCUMENTS

CN 101163571 A 4/2008
CN 101460715 A 6/2009

(Continued)

*Primary Examiner* — Audrey K Bradley
(74) *Attorney, Agent, or Firm* — Laurence A. Greenberg; Werner H. Stemer; Ralph E. Locher

(57) ABSTRACT

A device for supplying a liquid additive includes at least one tank and an extraction unit for delivering the liquid additive out of the tank to an additive consumer. The tank has a tank wall and the extraction unit is mounted on a mounting section of the tank wall. The tank wall is made of an injection molding compound and integrated stiffening structures are provided in the injection molding compound in the region of the mounting section. A method for producing the device and a motor vehicle having the device are also provided.

9 Claims, 3 Drawing Sheets

(56) References Cited

U.S. PATENT DOCUMENTS

| | | | |
|---|---|---|---|
| 6,669,043 B2 * | 12/2003 | Fish | F02M 37/103 220/4.14 |
| 8,042,621 B2 | 10/2011 | Barezzani et al. | |
| 8,474,518 B2 * | 7/2013 | Goto | C08L 77/06 165/173 |
| 8,586,895 B2 | 11/2013 | Haeberer et al. | |
| 9,074,610 B2 | 7/2015 | Harr et al. | |
| 9,097,164 B2 | 8/2015 | Bauer et al. | |
| 9,127,583 B2 | 9/2015 | Hodgson et al. | |
| 2009/0230136 A1 * | 9/2009 | Dougnier | F01N 3/2066 220/592.01 |
| 2011/0232271 A1 | 9/2011 | Haeberer | |
| 2012/0311999 A1 * | 12/2012 | Hodgson | F01N 3/2066 60/295 |
| 2013/0025269 A1 * | 1/2013 | Hodgson | F01N 3/2066 60/317 |
| 2013/0263941 A1 * | 10/2013 | Landes | F01N 3/2066 137/351 |

FOREIGN PATENT DOCUMENTS

| | | | | |
|---|---|---|---|---|
| CN | 102713181 A | 10/2012 | | |
| DE | 19859343 A1 | 7/2000 | | |
| DE | 102009000094 A1 | 7/2010 | | |
| DE | 102009024795 A1 | 12/2010 | | |
| DE | 102010014314 A1 | 10/2011 | | |
| DE | 102010029841 A1 | 12/2011 | | |
| DE | 102010047277 A1 | 4/2012 | | |
| JP | 2009508053 A | 2/2009 | | |
| JP | 2011007128 A | 1/2011 | | |
| KR | 1020090026285 A | 3/2009 | | |
| WO | WO 2011085830 A1 * | 7/2011 | | F01N 3/2066 |
| WO | 2011124637 A1 | 10/2011 | | |
| WO | 2011160836 A1 | 12/2011 | | |
| WO | WO-2012080129 A1 * | 6/2012 | | F01N 3/2066 |

\* cited by examiner

DEVICE FOR PROVIDING A LIQUID ADDITIVE

BACKGROUND OF THE INVENTION

Field of the Invention

The invention relates to a device for supplying a liquid additive, which device can for example be used for feeding the liquid additive to an exhaust-gas treatment device of a motor vehicle. For the purification of the exhaust gases of internal combustion engines in motor vehicles, use is made inter alia of exhaust-gas treatment devices in which an exhaust-gas purification process can be performed with the aid of a liquid additive. A method commonly implemented in such exhaust-gas treatment devices is the selective catalytic reduction (SCR) method in which nitrogen oxide compounds in the exhaust gas can be reduced with the aid of a reducing agent to form non-harmful substances (water, carbon dioxide and nitrogen). The reducing agent may be supplied in the form of liquid additive to the exhaust-gas treatment device. A liquid additive used for this purpose is urea-water solution. A 32.5% urea-water solution for exhaust-gas purification is available under the trade name AdBlue®.

Devices for supplying a liquid additive typically have a tank for storing the liquid additive and an extraction unit for extracting the liquid additive from the tank. The extraction unit effects the delivery of the liquid additive to an additive consumer. The extraction unit may also be responsible for precise dosing of the liquid additive. The additive consumer is for example an exhaust-gas treatment device (such as an SCR catalytic converter) or a feed device, provided at the exhaust-gas treatment device, for the liquid additive. A feed device of said type may have a controllable injector by means of which it is possible to set whether additive is fed to the exhaust-gas treatment device.

For passenger motor vehicles in particular, it is desirable, owing to the very limited installation space available, for a device of said type to be adapted as precisely as possible to the available installation space. In passenger motor vehicles, there is normally installation space available only in the underfloor region or in the region of the rear axle (for example above the wheels of the rear axle). The adaptation of the device to the available installation space typically necessitates highly complex tank geometries, which for example have special bulges, indentations, curvatures and/or undercuts and which deviate from otherwise conventional, typically cuboidal or cylindrical tank forms. Such tank geometries are however presently difficult or cumbersome to produce, wherein classic production methods are not suitable for this.

Since a device for supplying a liquid additive constitutes an additional supply system in a motor vehicle, it is furthermore important for the device to be particularly durable and at the same time inexpensive. In particular, the production of the device and the components and materials used should be particularly inexpensive. At the same time, it should also be possible for individual components of the device to be accessed for maintenance purposes and/or exchanged with the least possible effort.

BRIEF SUMMARY OF THE INVENTION

Taking this prior art as a starting point, it is an object of the present invention to solve, or at least lessen, the technical problems discussed. It is sought in particular to propose a particularly inexpensive device for supplying a liquid additive, which device can in particular also be adapted in a particularly effective manner to the available installation space in a motor vehicle.

Said objects are achieved by means of a device according to the features recited below. Further advantageous refinements of the invention are specified in the dependent claims. The features specified individually in the claims may be combined with one another in any desired technologically meaningful way and may be supplemented by explanatory facts from the description, with further design variants of the invention being specified.

The invention relates to a device for supplying a liquid additive, having at least a tank and an extraction unit for the delivery of the liquid additive from the tank to an additive consumer, wherein the tank has at least one tank wall and the extraction unit is mounted on a mounting section of the tank wall, wherein the tank wall is composed of injection-molding compound, and integrated stiffening structures are provided in the injection-molding compound in the region of the mounting section.

The tank of the device has an interior in which the liquid additive in the tank is stored. The interior of the tank is delimited by the tank wall. The tank wall typically has a region which can be regarded as tank top side, and a region which can be regarded as tank bottom. Furthermore, there are preferably lateral tank wall sections which connect the tank top side and the tank bottom to one another.

The extraction unit extracts the liquid additive from the tank at an extraction point which is preferably arranged in the vicinity of the tank bottom or on the tank bottom itself. By means of this arrangement, it is possible by means of the extraction unit for the contents of the tank—that is to say the liquid additive—to be completely extracted from the tank. It is also possible for multiple extraction units to be provided.

The extraction unit preferably has a multiplicity of active components which effect the delivery of the liquid additive and possibly also the dosing of the liquid additive. Said components may for example comprise the following elements: at least one pump which delivers and/or doses the liquid additive, at least one valve which controls the delivery and/or the dosing, at least one sensor by means of which the delivery and/or the dosing can be monitored, and at least one filter by means of which liquid additive supplied by the device can be filtered.

The extraction unit is preferably mounted on the tank wall of the tank. There are preferably various fastening elements provided on the tank wall, by means of which fastening elements the active components can be connected to one another. The tank wall thus forms a type of base plate or a type of mounting plate for the extraction unit. That section of the tank wall on which the extraction unit or the components of the extraction unit are mounted is referred to as mounting section. The mounting section thus extends substantially only over a region of the tank wall on which the active components and/or for example a housing of the extraction unit are/is provided. In particular, the mounting section of the tank wall ends with an external (encircling) edge of for example at most 10 cm or even only at most 5 cm [centimeters] around the extraction unit.

In the region of the mounting section, the tank wall preferably has an inwardly protruding portion. The inwardly protruding portion preferably extends into the interior of the tank proceeding from an outer side. The inwardly protruding portion preferably forms a section of a housing of a chamber which is separated from the interior of the tank. During the operation of the device, said chamber is dry or free from liquid additive (aside from within the provided ducts or within active components). When the extraction unit is mounted on the mounting section, the mounting unit is preferably arranged (in particular entirely) within the chamber formed by the inwardly protruding portion. The chamber or the inwardly protruding portion may preferably be closed off from an outer side of the tank by way of a cover. It is thus possible for the extraction unit in the chamber to be protected against contaminants from the outside.

The tank wall is manufactured from injection-molding compound, and stiffening structures are integrated into the injection-molding compound in the region of the mounting section.

The injection-molding compound is composed, for example, of polyethylene (PE), polypropylene (PP) or polyoxymethylene (POM). As polypropylene, use is preferably made of HDPE (HD=high density). The suitability of POM in particular for tanks for storing common liquid additives has been proven. By virtue of the fact that the tank wall or the tank is composed of injection-molding compound, and/or has been produced by means of an injection-molding process, it is possible for the tank to have particularly complex geometries. For example, the tank may have inwardly protruding portions, outwardly protruding portions, undercuts and similar geometrical forms. It is possible for the entire tank wall of the tank to be produced in a single injection-molding process. It is also possible for the tank to be composed of two tank sections which are in the form of half-shells and which are welded to one another and thus form the complete tank. The tank is preferably manufactured from an upper shell and a lower shell which are connected to one another by way of an encircling weld seam.

Even though the injection-molding process makes it possible to produce particularly complex tank geometries which are adapted to the available installation space, it is not possible, or is possible only with increased outlay, to adhere to precise manufacturing tolerances. This poses a difficulty in particular when it is sought to ensure a high rate of manufacture for the tanks. To be able to adhere to precise manufacturing tolerances, slow cooling rates of the tank in the injection-molding tool are necessary because the subsequent shrinkage is normally only reduced through the imperative follow-up feed of additional injection-molding compound into the injection-molding tool already during the shrinkage process, which additional injection-molding compound can compensate for the shrinkage. The subsequent shrinkage impedes adherence to precise manufacturing tolerances. Slow cooling rates entail lower productivity per injection-molding tool.

Precise manufacturing tolerances are however required specifically when the tank wall is to have a mounting section on which the extraction unit or components of the extraction unit are mounted. In particular, it is necessary for (liquid-conducting and/or electrical) connections for components of the extraction unit on the tank wall to be positioned in a particularly precise manner. To be able to adhere to precise manufacturing tolerances in the region of a mounting section of the tank wall in a particularly simple and inexpensive manner, it is proposed here that stiffening structures which are integrated in the injection-molding compound are provided in the region of said mounting section. By means of stiffening structures of said type, the injection-molding compound is stiffened in the region of the mounting section, and precise tolerances can be adhered to. By means of the stiffening structures, the shrinkage phenomenon can be reduced, because the shrinking injection-molding material is replaced, in part, by the stiffening structures. Secondly, by means of the stiffening structures, the shrinkage that occurs can be oriented such that the shrinkage does not result in inadmissible influencing of the tolerances required for the mounting of the extraction unit in the mounting section.

In this case, the at least one stiffening structure is integrated or worked into the injection-molding compound. In this case, the stiffening structure is predominantly or even (practically) completely surrounded by ("integrated" in) the injection-molding compound. In particular, the stiffening structure is added to or inlaid into the injection-molding compound during the production of a tank wall. Even though it is possible according to the invention for a single stiffening structure to be provided (which may be of complex form and comprise multiple sub-components), the use of a multiplicity of (discrete or separate) stiffening structures is preferable. The number and/or orientation of the stiffening structures may be adapted to the design or the arrangement of the active components in the mounting section ("anisotropism" over the mounting section). It is however also possible for the stiffening structures to be provided uniformly over the mounting section ("isotropism" over the mounting section).

The provision of stiffening structures in the region of the mounting section thus makes it possible for an injection-molding tool to be used even with considerably higher cycle frequencies and for faster cooling rates to be permitted, and at the same time for manufacturing tolerances to be very precisely adhered to in the region of the mounting section.

The device is particularly advantageous if the mounting section is connected to a further tank wall by a weld seam.

The mounting section preferably constitutes a wall section that is manufactured independently of the rest of the tank. The mounting section and the further tank wall are preferably manufactured in mutually separate injection-molding processes. The further tank wall preferably has an opening into which the tank wall can be inserted by way of the mounting section. The mounting section and the further tank wall are then connected to one another preferably by way of a welding process, such that a weld seam is formed between the tank wall with the mounting section and the further tank wall. By means of such a division, it is possible for respectively precisely suited, correspondingly adapted injection-molding processes to be used for the manufacture of the mounting section and for the manufacture of the further tank wall.

It is preferable for the same injection-molding compound to be used both for the manufacture of the tank wall with the mounting section and for the manufacture of the further tank wall. Welding of the mounting section and of the further tank wall is then possible in a particularly problem-free manner.

The described additional stiffening structures can be inlaid into the injection-molding compound during the manufacture of the mounting section. It is also possible for the mounting section and the further tank wall to be produced with different cooling rates after the injection-molding process. It can thus be achieved that the shrinkage in the region of the mounting section is considerably less than that over the rest of the tank wall.

The device is furthermore advantageous if the tank wall has integrated stiffening structures only in the region of the mounting section, and the further tank wall has no stiffening structures.

It is also possible for stiffening structures, and in particular stiffening fibers, to also be included in the further tank wall. The fraction and stiffening action of the stiffening structures in the further tank wall are only considerably lower than the fraction and the stiffening action of the stiffening structures in the region of the mounting section.

For example, the resulting stiffness (that is to say the stiffness of the injection-molding compound with stiffening structures) in the region of the mounting section is at least twice as great as the stiffness of the further tank wall.

The provision of no stiffening structures in the further tank wall yields a considerable overall reduction in costs for the device. Since no components have to be mounted on the further tank wall, adherence to tolerances is not as relevant in the case of the further tank wall as in the case of the mounting section.

Furthermore, the device is advantageous if, on the mounting section, there is provided at least one connection element for the connection of at least one component for the delivery or dosing of the liquid additive.

A connection element is preferably a fluidic connection element which forms a connection between the interior of the tank and an active component, or between two different active components, of the extraction unit. A connection element may for example be composed of an (integrated) pipe and/or an (integrated) bushing and/or an (integrated), possibly electrical, plug connector, these being integrated into the tank wall in the region of the mounting section. For example, a connection element may be inserted into the injection-molding die during the injection-molding process, and fixedly connected to the injection-molding compound of the tank wall or of the mounting section by way of the injection-molding process. The provision of connection elements of said type in the mounting section simplifies the mounting of the extraction unit on the mounting section.

The device is furthermore advantageous if the integrated stiffening structures comprise stiffening fibers.

Stiffening fibers may also be worked into the injection-molding compound, and directly jointly processed during the injection-molding process, in the region of the mounting section. Stiffening fibers may for example be glass fibers and/or or carbon fibers, which have for example a fiber length in the range from 1 cm [centimeter] to 4 cm. Stiffening fibers are a particularly inexpensive means for integrating stiffening structures into the tank wall in the region of the mounting section, because it is merely necessary to modify the injection-molding compound for the mounting section, and there is no need for special preparation of the injection-molding tool, for example through placement of the stiffening structures into the injection-molding tool.

The device is furthermore advantageous if the stiffening fibers make up a fraction of between 5 percent and 40 percent of the weight of the mounting section. The fraction of the stiffening fibers preferably lies in the range between 5 percent and 20 percent, and is particularly preferably approximately 10 percent.

The weight fraction is in this case in relation only to the tank wall in the region of the mounting section, wherein the weight fraction between 5 percent and 40 percent relates only to the weight of the injection-molding compound together with the stiffening fibers, and any additional components (for example connection elements inlaid or integrally cast in the mounting section) are disregarded. Such a weight fraction of the stiffening fibers makes it possible to provide a particularly dimensionally stable tank wall in the region of the mounting section, which adheres particularly precisely to predefined tolerances. At the same time, an injection-molding compound with such a weight fraction of stiffening fibers can be processed easily.

The device is furthermore advantageous if the integrated stiffening structures comprise at least one stiffening mat.

A stiffening mat may for example be a fiber mat which may for example be composed of glass fibers and/or carbon fibers. The stiffening mat may be composed of a structured fibrous fabric and/or of a stochastic fiber entanglement (a nonwoven). A stiffening mat of said type may for example be placed into an injection-molding die in the region of the mounting section and surrounded or encapsulated by the injection-molding compound during the injection-molding process. A stiffening structure of said type composed of a stiffening mat permits particularly precise adherence to tolerances and particularly intense stiffening of the mounting section, because the orientation of fibers in a stiffening mat of said type is precisely predefined, and the mechanical influence of the stiffening mat on the mounting section can thus be determined with particularly high accuracy. It is also possible for layers and/or regions with multiple (if appropriate different) fiber mats to be formed.

The device is furthermore advantageous if the integrated stiffening structures comprise at least one stiffening lattice.

A stiffening lattice, too, can be placed into the injection-molding die before the injection-molding process and encapsulated by the injection-molding compound during the injection-molding process. A stiffening lattice (which in itself is dimensionally stable) acts similarly to a stiffening mat. The stiffening lattice may for example be a metallic wire lattice. A lattice of said type has the additional effect that the tank wall exhibits improved thermal conductivity in the region of the mounting section, which makes it possible for heat (generated for example by a heater) to be conducted through the mounting section in a more effective manner.

It is also possible for the connection elements described further above, for example, to be fixedly connected to a stiffening lattice. Then, an insert is placed into the injection-molding die, which insert is composed for example of the stiffening lattice and the connection elements fastened to the stiffening lattice. Said insert is then only partially surrounded by the injection-molding compound. Here, the stiffening lattice itself should be fully surrounded by the injection-molding compound, whereas the connection elements can protrude out of the injection-molding compound. With a firm connection between the connection elements and the stiffening lattice, particularly good heat transfer between the connection elements and the stiffening lattice is also provided.

According to a further aspect of the invention, it is also the intention here to specify a preferred method for producing the described device. Said method comprises at least the following steps:

a) producing a tank for storing a liquid additive, having a tank wall which has an opening, wherein an injection-molding process is used for the production of said tank;
b) producing a mounting section for the tank wall, wherein an injection-molding process is used for the production process, and stiffening structures are incorporated into the mounting section;
c) inserting the mounting section into the opening of the tank wall; and
d) connecting the mounting section and the further tank wall by means of a weld seam.

The advantages and special design features explained with regard to the described device can be applied and transferred analogously to the method described here. The same applies to the special advantages and design features described below for the method, which can be transferred analogously to the described device.

What is essential for said preferred method is that the tank with the tank wall and the opening (step a)) is produced separately from the mounting section (step b)). This is preferably performed using mutually separate injection-molding tools. The connection between the mounting section and the tank or the further tank wall is then produced in steps c) and d). Said method permits particularly inexpensive and simple production of a tank which has a stiffened tank wall in the region of the mounting section. It is also not necessary for the tank to be produced as a complete part in step a). It is also possible for multiple sub-sections of the tank to be produced by mutually separate injection-molding processes and likewise connected to one another by way of welding processes.

The method is particularly advantageous if the opening is circular, the mounting section has a circular outer edge, and in step d), a friction welding process is used to form the weld seam, wherein the mounting section is moved rotationally relative to the further tank wall. The rotation need not be a complete rotation. It is also possible for the mounting section to be moved back and forth in the region of the opening through an angle of only a few degrees in each case. In this way, the material of the tank wall is melted in the region of the circular outer edge and in the region of the opening, and the mounting section is permanently and fixedly connected to the tank wall. By means of a welding process of said type, it is possible to dispense with additional welding materials for forming the weld seam.

A friction welding process is particularly well-suited for welding plastics components to one another.

It is also sought here to specify a modification of the preferred method, in which a different injection-molding material is used for the production of the mounting section of the tank wall in step b) than is used for the production of the further tank wall in step a). The injection-molding compound for step b) preferably has a higher strength, and permits more precise processing, with adherence to more precise tolerances, than the injection-molding compound for step a). It may then be possible in step a) to even dispense with separate stiffening structures in the mounting section. The stiffening structures are then formed by the special injection-molding compound for the mounting section. Accordingly, a device is also possible which has a different injection-molding compound in the region of the mounting section than in the region of the further tank wall. An important prerequisite for this is however that the different injection-molding compounds can be welded to one another in order that the mounting section of the tank wall and the further tank wall can be connected to one another.

According to a further aspect of the invention, the invention is used in particular in a motor vehicle having an internal combustion engine, having an exhaust-gas treatment device for the purification of the exhaust gases of the internal combustion engine and having a described device by means of which a liquid additive can be supplied to the exhaust-gas treatment device. An SCR catalytic converter is preferably provided in the exhaust-gas treatment device. The exhaust-gas treatment device is an additive consumer. A liquid additive can be supplied to the exhaust-gas treatment device by means of the device. By means of the liquid additive, the method of selective catalytic reduction for exhaust-gas purification can be implemented in the SCR catalytic converter.

BRIEF DESCRIPTION OF THE SEVERAL VIEWS OF THE DRAWING

The invention and the technical field will be explained in more detail below on the basis of the figures. The figures show particularly preferred exemplary embodiments, to which the invention is however not restricted. In particular, it should be noted that the figures and in particular the illustrated proportions are merely schematic. In the figures.

In the figures, identical components will generally also be denoted by the same reference signs. Below, therefore, the corresponding components in FIGS. 1 to 3 will firstly be discussed jointly.

DESCRIPTION OF THE INVENTION

Figure 1:
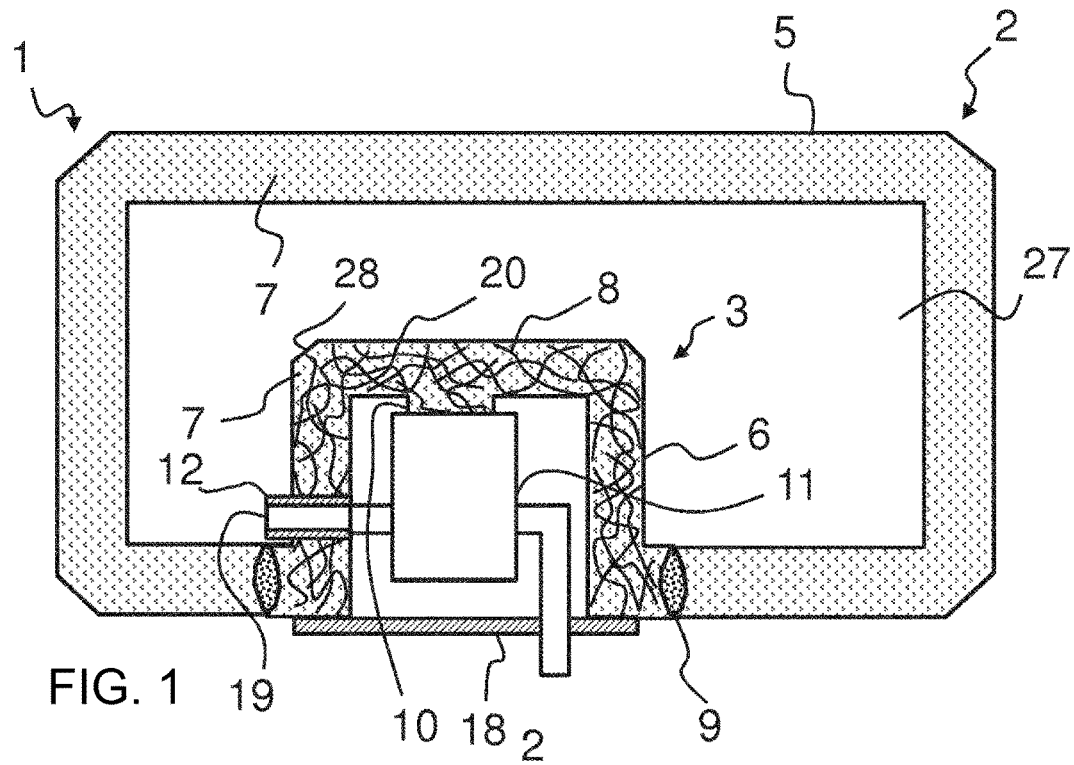
FIG. 1: shows a first design variant of the described device.
Figure 2:
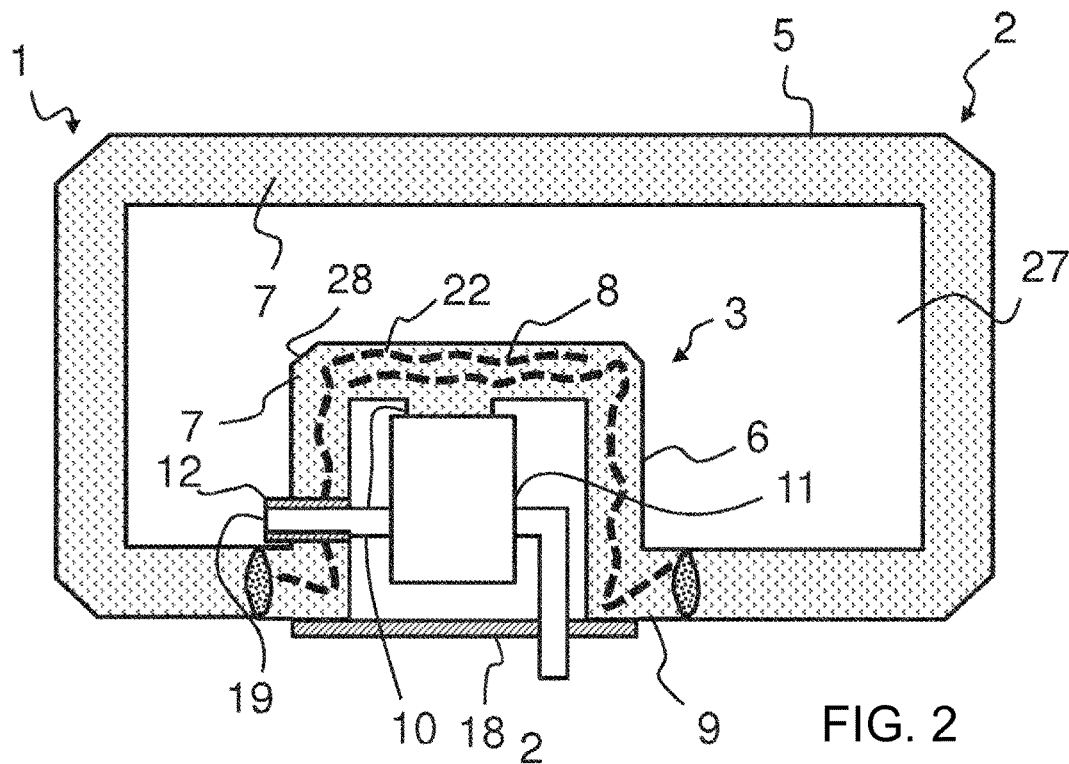
FIG. 2: shows a second design variant of the described device.
Figure 3:
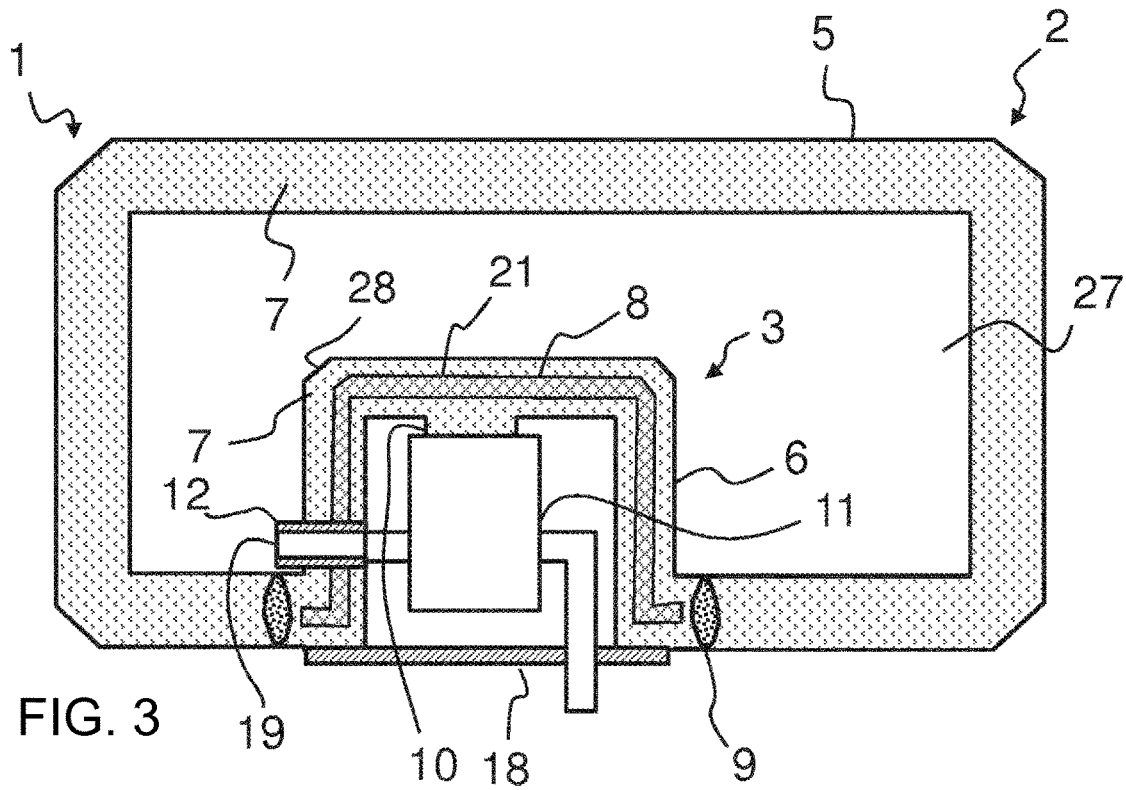
FIG. 3: shows a third design variant of the described device.

FIGS. 1 to 3 show in each case different design variants of a device 1, in each case having a tank 2 which has a tank wall 5 and which is manufactured from an injection-molding compound 7 by way of an injection-molding process. The tank wall 5 has a mounting section 6 at which an extraction unit 3 for the extraction of liquid additive from the tank 2 is mounted on the tank wall 5. The extraction unit 3 is designed for extracting the liquid additive (such as liquid urea-water solution) from the tank 2 at an intake point 19. The intake point 19 may for example be formed by a bushing which is inlaid, as an insert part 12, into the tank wall 5 and which produces a fluidic connection from the interior 27 of the tank 2 to a component 11 of the extraction unit 3. The component 11 of the extraction unit 3 may for example be a pump. The liquid additive is delivered, and if appropriate also dosed, by means of said component 11. On the mounting section 6 there is preferably provided a connection element 10 on which the component 11 can be mounted. For the stiffening of the tank wall 5 in the mounting section 6, stiffening structures 8 are inlaid in the injection-molding compound 7. The mounting section 6 of the tank wall 5 is incorporated into the further tank wall 5, or connected to the further tank wall 5, in each case by way of a weld seam 9. In each of FIGS. 1 to 3, the mounting section 6 forms an inwardly protruding portion 28 into an interior of the tank. Said inwardly protruding portion 28 can be closed off from an outer side by way of a cover 18. Accordingly, the mounting section 6 and the cover 18 form a chamber which is separated from the further tank 2 and in which the extraction unit 3 is situated.

In FIG. 1, the stiffening structures 8 are in the form of stiffening fibers 20. In FIG. 2, the stiffening structures 8 are formed by a (single) stiffening mat 22. In FIG. 3, the stiffening structures 8 are formed by a (single) inlaid stiffening lattice 21.

Figure 4:
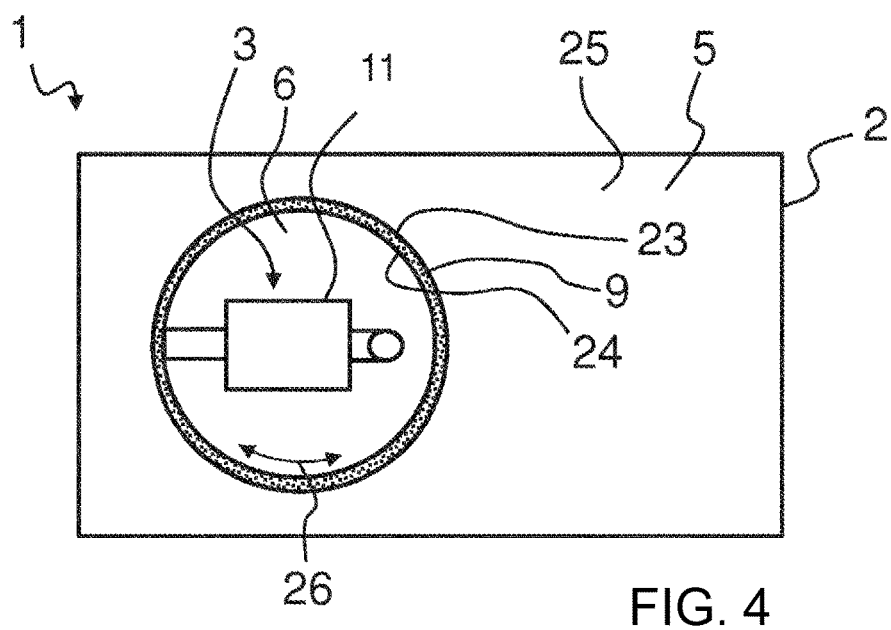
FIG. 4: shows a view from below of a described device.

FIG. 4 shows, in a view from below, a device 1 having a tank 2 and having an extraction unit 3. The figure shows the tank bottom 25 which is formed by the tank wall 5 of the tank 2. The figure also shows the mounting section 6. The further tank wall 5 has a circular opening 23 into which the mounting section 6 is inserted by way of an annular outer edge 24. Owing to the circular shape of the opening 23 and of the outer edge 24, it is possible for the mounting section 6 and the further tank wall 5 to be connected to one another by way of a friction welding process. The required frictional movement 26 is indicated here by way of an arrow. For better illustration, FIG. 4 also illustrates the component 11 of the extraction unit 3. FIG. 4 substantially shows the device 1 illustrated in FIGS. 1 to 3 in a view from below, with the cover, which covers the inwardly protruding portion formed by the mounting section 6 as per FIGS. 1 to 3, having been removed.

Figure 5:
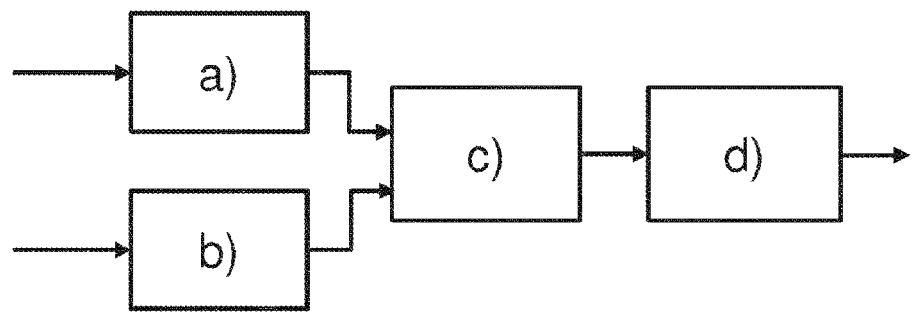
FIG. 5: shows a diagram of the described method.

FIG. 5 shows a flow diagram of the described method. The figure shows the method steps a) and b), in which the tank (step a)) and the mounting section (step b)) are in each case provided separately from one another. In the joining step c), the mounting section and the rest of the tank wall are brought together. In step d), the mounting section and the rest of the tank wall are connected to one another by way of a welding process.

Figure 6:
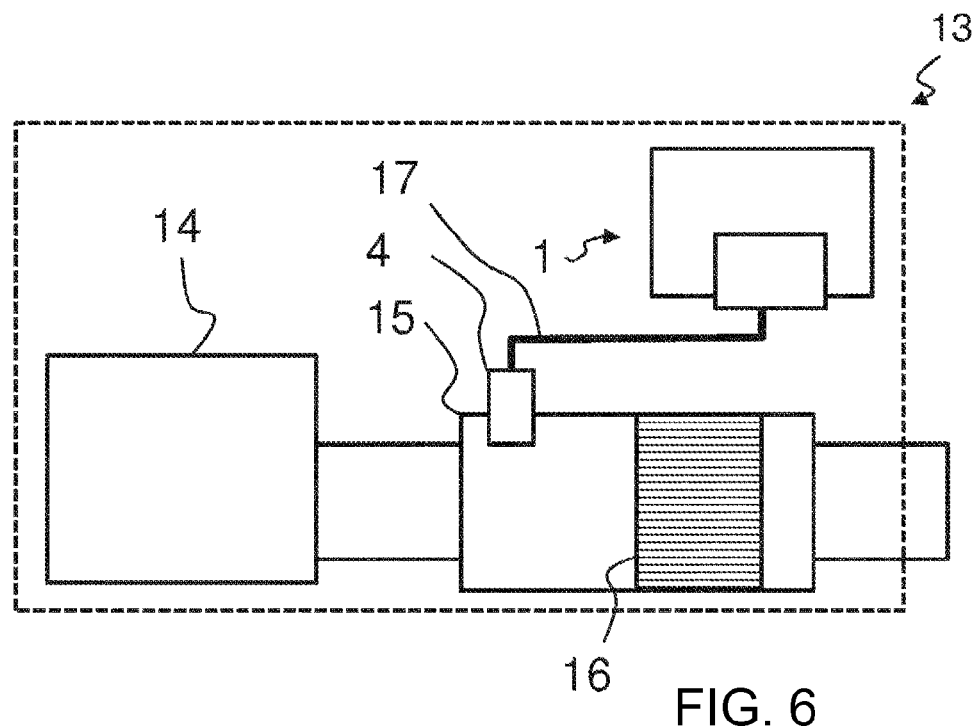
FIG. 6: shows a motor vehicle having a described device.

FIG. 6 shows a motor vehicle 13 having an internal combustion engine 14 and having an exhaust-gas treatment device 15 for the purification of the exhaust gases of the internal combustion engine 14. An SCR catalytic converter 16 is provided in the exhaust-gas treatment device 15. A liquid additive may be fed to the exhaust-gas treatment device 15 by way of an additive consumer 4. The additive consumer is for example a feed device which comprises an injector and/or a dosing valve. In order to be supplied with liquid additive, the additive consumer 4 is connected to the device 1 via a delivery line 17.

The described device may firstly have a tank which is adapted in a particularly precise manner to the shape of the installation space available for the tank in a motor vehicle. At the same time, the described device can be provided at particularly low cost. By means of the described device, it is thus possible for devices for supplying liquid additive/reducing agent (urea-water solution) to be used at low cost even in the passenger motor vehicle sector.

LIST OF REFERENCE SYMBOLS

1 Device
2 Tank
3 Extraction unit
4 Additive consumer
5 Tank wall
6 Mounting section
7 Injection-molding compound
8 Stiffening structure
9 Weld seam
10 Connection element
11 Component
12 Insert part
13 Motor vehicle
14 Internal combustion engine
15 Exhaust-gas treatment device
16 SCR catalytic converter
17 Delivery line
18 Cover
19 Intake point
20 Stiffening fibers
21 Stiffening lattice
22 Stiffening mat
23 Opening
24 Outer edge
25 Tank bottom
26 Frictional movement
27 Interior
28 Inwardly protruding portion

The invention claimed is:

1. A device for supplying a liquid additive, the device comprising:
a tank having at least one tank wall formed of injection-molding compound;
the at least one tank wall having a mounting section, the mounting section defining an inwardly projecting portion extending into an interior of the tank, the inwardly projecting portion defining a chamber being fluidically separated from the tank interior, and the inwardly projecting portion having integrated stiffening structures provided in the injection-molding compound along the inwardly projecting portion; and
an extraction unit including a pump, said extraction unit mounted on said inwardly projecting portion at the mounting section for delivering the liquid additive from the tank to an additive consumer, the extraction unit being disposed within the chamber.

2. The device according to claim 1, which further comprises at least one component for delivering or dosing the liquid additive, and at least one connector disposed at the mounting section for connecting the at least one component.

3. The device according to claim 1, wherein the integrated stiffening structures include at least one stiffening lattice.

4. The device according to claim 1, wherein the integrated stiffening structures include stiffening fibers.

5. The device according to claim 4, wherein the stiffening fibers make up between 5 and 40 percent of the weight of the mounting section.

6. A motor vehicle, comprising:
an internal combustion engine;
an exhaust-gas treatment device for purifying exhaust gases of the internal combustion engine; and
a device according to claim 1 for supplying a liquid additive to the exhaust-gas treatment device.

7. A device for supplying a liquid additive, the device comprising:
a tank having at least one tank wall formed of injection-molding compound;
the at least one tank wall having a mounting section and integrated stiffening structures provided in the injection-molding compound in the vicinity of the mounting section, the mounting section defining a chamber being fluidically separated from an interior of the tank; and
an extraction unit including a pump, said extraction unit mounted at the mounting section for delivering the liquid additive from the tank to an additive consumer, the at least one tank wall having a further tank wall section, and a weld seam connecting the mounting section to the further tank wall section.

8. The device according to claim 7, wherein the integrated stiffening structures of the at least one tank wall are disposed only in the vicinity of the mounting section, and the further tank wall section has no stiffening structures.

9. A device for supplying a liquid additive, the device comprising:
a tank having at least one tank wall formed of injection-molding compound;
the at least one tank wall having a mounting section and integrated stiffening structures provided in the injection-molding compound in the vicinity of the mounting section, the integrated stiffening structures including at least one stiffening mat; and
an extraction unit including a pump, said extraction unit mounted at the mounting section for delivering the liquid additive from the tank to an additive consumer.

* * * * *